United States Patent
Blank et al.

(10) Patent No.: US 6,441,097 B1
(45) Date of Patent: Aug. 27, 2002

(54) ALKYLARYL AND ARYLALKYL MONOSULFONIC ACID CATALYSTS FOR CROSSLINKING POLYETHYLENE

(75) Inventors: Werner J. Blank, Wilton; Edward T. Hessell, Fairfield, both of CT (US); Richard A. Abramshe, Highland, NY (US)

(73) Assignee: King Industries, Inc., Norwalk, CT (US)

( * ) Notice: Subject to any disclaimer, the term of this patent is extended or adjusted under 35 U.S.C. 154(b) by 0 days.

(21) Appl. No.: 09/909,230

(22) Filed: Jul. 19, 2001

Related U.S. Application Data
(60) Provisional application No. 60/222,894, filed on Aug. 3, 2000.

(51) Int. Cl.$^7$ .................................................. L08F 8/22
(52) U.S. Cl. ........................ 525/244; 525/246; 525/288; 525/326.5; 525/353
(58) Field of Search ................................. 525/244, 246, 525/288, 326.5, 353

(56) References Cited

U.S. PATENT DOCUMENTS

| | | | |
|---|---|---|---|
| 4,160,072 A | 7/1979 | Shinkai et al. | 521/86 |
| 4,252,906 A | 2/1981 | Hosokawa et al. | 521/86 |
| 4,297,310 A | 10/1981 | Akutsu et al. | 264/83 |
| 4,413,066 A | 11/1983 | Isaka et al. | 521/149 |
| 4,446,283 A | 5/1984 | Doi et al. | 525/344 |
| 4,753,992 A | 6/1988 | Umpleby | 535/100 |
| 5,350,812 A | 9/1994 | Sultan et al. | 525/477 |
| 5,393,823 A | 2/1995 | Konno et al. | 524/507 |
| 5,639,825 A | 6/1997 | Nanbu et al. | 525/100 |
| 6,005,055 A | 12/1999 | Dammert et al. | 525/326.5 |

*Primary Examiner*—Bernard Lipman
(74) *Attorney, Agent, or Firm*—Morgan & Finnegan, LLP

(57) ABSTRACT

The present invention is directed to a crosslinkable polymer composition comprising an alkoxysilane functional polyolefin and a silanol crosslinking catalyst selected from the group consisting of:

(i) an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons;

(ii) an arylalkyl sulfonic acid wherein the aryl is phenyl or naphthyl and is substituted with 1–4 alkyl groups wherein each alkyl group is a linear or branched alkyl with 5–20 carbons with each alkyl group being the same or different, and wherein the total number of carbons in the alkyl groups is in the range of 12–80;

(iii) a derivative of (i) or (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;

(iv) a metal salt of (i) or (ii) wherein the metal ion is selected from the group consisting of copper, aluminum, tin and zinc, and to a process for crosslinking an alkoxysilane functional polyolefin using a catalyst as defined above.

30 Claims, No Drawings

ALKYLARYL AND ARYLALKYL MONOSULFONIC ACID CATALYSTS FOR CROSSLINKING POLYETHYLENE

CROSS REFERENCE TO RELATED APPLICATIONS

This is a continuation in part application of provisional application, Ser. No. 60/222,894, filed Aug. 3, 2000. This is co-pending with application entitled: ALKYLATED ARYL DISULFONIC ACID CATALYSTS FOR CROSSLINKING POLYETHYLENE being filed concurrently.

FIELD OF INVENTION

The present invention is directed to a crosslinkable polymer composition comprising an alkoxysilane functional polyolefin and a naphthalene monosulfonic acid, or an arylalkyl sulfonic acid, or a derivative or a salt of naphthalene monosulfonic acid or arylalkyl sulfonic acid as a crosslinking catalyst. More particularly, the present invention is directed to a silane functional polyolefin and an alkylated naphthalene monosulfonic acid wherein the naphthalene ring is substituted with 1–4 C5 to C20 alkyl groups and the total number of carbons in the alkyl groups is in the range of 20 to 80 carbons or an arylalkyl sulfonic acid wherein the aryl group is substituted with 1–4 C5 to C20 alkyl groups and the total number of carbons in the alkyl groups is in the range of 12 to 80 carbons. The catalyst of the present invention also includes a derivative of the sulfonic acid of the present invention hydrolyzable to the corresponding sulfonic acid and a metal salt of the sulfonic acid of the present invention.

The catalysts of the present invention form a single phase when mixed with a polyolefin and are highly compatible therewith. The catalysts of the invention also provide an improved cure rate having higher catalyst activity. Moreover, the electro-conductivity of the catalysts are expected to be very low and it is anticipated that the electrical resistance of the resulting crosslinked polymeric coating will be excellent. The resulting crosslinked polymeric compositions are desirable for use as coatings for electrical cables and wires.

BACKGROUND OF THE INVENTION

Thermoplastic polyolefins such as polyethylene have long been known as excellent dielectric materials for use as insulation in the manufacture of power cables. The major drawback of thermoplastic polyethylene is the relatively low temperature at which it softens and flows. The upper temperature at which thermoplastic polyethylene is useful is 75° C., which is rather low. This temperature may be increased by crosslinking. However, polyethylene is a linear polymer with no functional groups along the chain for crosslinking. Thus, to crosslink polyethylene, the polymer chain needs to be activated or provided with functional groups. Although polyethylene is described here, the present discussion is applicable generally to polyolefins.

One way to crosslink polyethylene is to incorporate a peroxide crosslinking agent to provide a source of free radicals when heated to a temperature higher than its decomposition temperature. The free radical extracts a hydrogen from the polyethylene backbone to produce alkyl radicals which combine to crosslink the linear polyethylene. However, polyethylene tends to scorch at a low temperature, which limits the temperature at which the polyethylene can be heated to provide crosslinking and to produce an extruded coated wire. For this reason, wires produced by using peroxide to crosslink polyethylene require a specialized extruder equipped with a high pressure continuous vulcanization (CV) tube. However, this extruder is very expensive and costly to operate.

Another way to crosslink polyethylene is to use electron beam irradiation to form free radicals. This process avoids the use of the high pressure continuous vulcanization extruder. However, the use of electron beam radiation prevents the use of carbon black commonly used as a pigment in coated wires. Further, it was found that where a thicker coating material is desired, the thickness of the material prevents penetration by the electron beam leading to non-uniformity of the resulting coating, thereby posing challenging engineering problems. Moreover, the equipment to produce high energy radiation and the necessary special shielding are also very expensive.

A third way of crosslinking polyethylene is to incorporate a second component, an unsaturated silane compound, such as vinyl alkoxysilane into the polyethylene. A small amount of a vinyl alkoxysilane, preferably vinyl trimethoxysilane (VTMS), at a level of 0.5% to 5%, preferably 2%, is incorporated into the backbone of the polyethylene chain and moisture cured.

Suitable unsaturated silanes would be of general structure, $CH_2=CH—Si—(OR)_3$, wherein R is any alkyl group of 1–4 carbons. Examples of unsaturated silane compounds would be vinyltrimethoxysilane, vinyltriethoxysilane, and vinyldimethoxyethoxysilane. The most preferred is vinyltrimethoxysilane (VTMS).

The crosslinking of polyethylene using VTMS is a two step process. The first step involves hydrolysis of the methoxy group to a hydroxy group with the liberation of methanol. The second step is a condensation step to release $H_2O$ to crosslink or cure the polymer. The hydrolysis step requires the presence of water and the catalyst used must not be soluble in water or affected thereby. The rate of cure of silane functionalized polyethylene is controlled by silane concentration, silane structure, catalyst concentration and type, resin crystallinity, coating thickness, the rate at which water penetrates into the inner layers of the polymer, the cure temperature, and the relative humidity.

There are many advantages to this process. It is a single line process. That is, the VTMS modified polyethylene can go directly from the reactor to the extruder without going through grafting and/or compounding. This process also provides a product that is very clean with uniform density and molecular weight distribution.

Methods of incorporating hydrolyzable silane groups into a polyethylene followed by crosslinking of the resulting silane functional polymer are known.

Shinkai et al., U.S. Pat. No. 4,160,072 and Hosokawa et al., U.S. Pat. No. 4,252,906, disclosed zinc carboxylates as the crosslinking catalyst for foamable and crosslinkable silane functional polyethylene.

Akutsu et al., U.S. Pat. No. 4,297,310 disclosed a process for producing moisture crosslinkable polymer by copolymerization of ethylene and an unsaturated silane compound. Metal salts of carboxylic acids, organic bases, inorganic acids and organic acids were disclosed as suitable crosslinking catalysts for this system. Toluene sulfonic acid was among one of the organic acids listed.

Isaka et al., U.S. Pat. No. 4,413,066, described a copolymer of ethylene and an ethylenically unsaturated silane in combination with a crosslinking catalyst. The copolymer may further comprise a monomer copolymerizable with the ethylene and the ethylenically unsaturated silane compound. The catalysts include metal carboxylate salts, organic bases, inorganic acids and organic acids as the crosslinking catalysts. Although toluene sulfonic acid was disclosed as being a suitable crosslinking catalyst, the preferred catalysts are the carboxylates of tin.

Doi et al., U.S. Pat. No. 4,446,283, described a copolymer consisting essentially of ethylene and a specific unsaturated silane compound having a (meth)acrylate group as a copolymerizable group and a methoxy group as a hydrolyzable group, and an effective amount of a silanol crosslinking catalyst. The catalysts useful for crosslinking are the same as those previously described. Umpleby, U.S. Pat. No. 4,753,992, discloses a crosslinkable composition comprising a silyl polymer and a silanol crosslinking catalyst which is a polymeric tin compound. However, the electro-conductivity of tin or metal salts of the carboxylic acids, and the inorganic acids disclosed by Isaka et al. are relatively high. It is not desirable to incorporate such compounds in a wire coating that should be an insulation material. In addition, the metal carboxylates and inorganic metal salts provide a slower rate of cure than the catalysts useful in the present invention.

Another process for crosslinking polyethylene was described in Konno et al., U.S. Pat. No. 5,393,823. Konno et al. disclosed a paint composition wherein a vinyl polymer is obtained by copolymerizing a vinyl monomer with a siloxy group and a polyisocyanate compound in the presence of a radical generator. The vinyl siloxy monomer with a radical generator and a curing agent are mixed with a siloxy dissociating catalyst. The compounds suitable as the dissociation catalyst include phosphoric acid and its salts, organic phosphates, and phosphites. Also included as dissociation catalysts are toluene sulfonic acid, naphthalene disulfonic acid and their amine salts. See also, Nanbu et al., U.S. Pat. No. 5,639,825. However, the use of organic acids such as toluene sulfonic acids and naphthalene disulfonic acid causes discoloration in the polymer produced. Such catalysts are not useful in the present invention because they have a high degree of water solubility and are extracted from the polymeric composition during the moisture curing process.

Recently, Dammert et al., U.S. Pat. No. 6,005,055 disclosed the use of alkylated benzene and naphthalene aulfonic acids as suitable silanol condensation catalysts for crosslinking silane functional polyethylene. The alkylated benzene and naphthalene sulfonic acids are disclosed to have a total of 14 to 28 carbons. For alkylated benzene sulfonic acids, there are a total of 8–20 carbon atoms in the substituent alkyl groups. For naphthalene sulfonic acid, there are a total number of 4 to 18 carbons, preferably 10 to 18 carbon atoms, in the substituent alkyl groups. In particular, dodecyl benzene sulfonic acid and tetrapropyl benzene sulfonic acid were exemplified. These compounds were compared with p-toluene sulfonic acid to show dramatic improvement in the copolymer produced.

However, it would be more desirable to have a catalyst that is more compatible with the polymer system, is non-extractable into water and is more highly active to improve the cure rate at ambient temperatures.

SUMMARY OF THE INVENTION

The present invention provides a crosslinkable polymer composition comprising a silane functional crosslinkable polyolefin with a crosslinking catalyst selected from the group consisting of:

(i) an alkylated naphthalene monosulfonic acid substituted with 1–4 alkyl groups wherein each alkyl group is a linear or branched alkyl with 5–20 carbons with each alkyl group being the same or different and wherein the total number of carbons in the alkyl groups is in the range of 20 to 80 carbons;

(ii) an arylalkyl sulfonic acid wherein the aryl is phenyl or naphthyl and is substituted with 1–4 alkyl groups wherein each alkyl group is a linear or branched alkyl with 5–20 carbons with each alkyl group being the same or different and wherein the total number of carbons in the alkyl groups is in the range of 12–80;

(iii) a derivative of (i) or (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;

(iv) a metal salt of (i) or (ii) wherein the metal ion is selected from the group consisting of copper, aluminum, tin and zinc.

Suitable alkyl substituted naphthalene monosulfonic acids include didodecylnaphthalene monosulfonic acid and tridodecyl naphthalene monosulfonic acid, tetradodecylnaphthalene monosulfonic acid and a mixture thereof. Suitable arylalkyl sulfonic acids include those where aryl is phenyl or naphthyl substituted with 1–4 alkyl groups with the total number of carbons in the alkyl groups being in the range of 12–80. Preferably, the total number of carbons is in the range of 25–50. The derivatives may be alkyl esters of the sulfonic acid including epoxy blocked sulfonic acid esters and amine salts of the sulfonic acids of the present invention. For the metal salts of (i) or (ii), the metal is selected from the group consisting of copper, aluminum, tin, and zinc. Particularly preferred are the zinc, tin, and aluminum salts.

DETAILED DESCRIPTION OF THE INVENTION

The invention is directed to a crosslinkable polyolefin composition comprising a silane functional polyolefin and a crosslinking catalyst selected from the group consisting of an alkylated naphthalene monosulfonic acid, an arylalkyl sulfonic acid, a derivative thereof and a metal salt thereof. The alkylated naphthalene monosulfonic acids, and the arylalkyl sulfonic acids and the derivatives and salts thereof provide improved compatibility with the polyolefin and are less soluble in water. This reduces leaching of the catalyst into the water to provide an improved crosslinked polymer composition and an improved cure rate. Further, the crosslinked polymer composition is anticipated to have lower conductivity and is, therefore, more desirable for use as insulation for electrical wiring.

The polyolefin used in the composition depends on the type of technology used to produce the silane functional polymer. For post grafting technology, so called "Sioplas technology" and the "monosil technology", where the grafting and addition of catalyst are all conducted in a single step, almost any polyolefin is acceptable. Examples of suitable polyolefins would be polyethylene, polypropylene, polyisobutylene, or mixtures thereof. Other suitable polymers would be the copolymers of ethylene with at least one of the following alpha-olefin monomers: 1-propene, 1-butene, 1-hexene, 1-octene and styrene. Such copolymers of ethylene with other alpha-olefins are commonly referred to as low density polyethylene (LDPE) and linear low density polyethylene (LLDPE). Also suitable would be copolymers of ethylene with a monomer selected from the following: vinylethers such as vinylmethyl ether, vinylethylether and phenylvinylether; acrylates such as methylacrylate, ethylacrylate, and methylmethacrylate; and vinyl esters such as vinylacetate.

The most preferred polyolefin for post grafting of a silane group thereon is polyethylene. Where an unsaturated silane compound is copolymerized with an olefin to incorporate the silane to the main chain of the polymer backbone, ethylene is the only suitable olefin.

The invention is further directed to a process for crosslinking silane functional polyolefin using a catalyst selected from the group consisting of an alkylated naphthalene monosulfonic acid with 1–4 linear or branched alkyl groups wherein the total number of carbons in the alkyl groups is 20 to 80, an arylalkyl sulfonic acid wherein the aryl is benzene or naphthalene substituted with 1–4 linear or branched alkyl groups wherein the total number of carbons in the alkyl group is 12–80, a derivative thereof, and a metal salt thereof. The concentration of the catalyst in the crosslinkable polyethylene composition is in the range of 0.0005 to 0.005 mM/g, preferably in the range of 0.001 to 0.003 mM/g.

The present invention is directed to a crosslinkable polyolefin composition comprising a silane functional polyolefin and a crosslinking catalyst selected from the group consisting of:
   (i) an alkylated naphthalene monosulfonic acid substituted with 1–4 alkyl groups wherein each alkyl group is a linear or branched alkyl with 5–20 carbons with each alkyl group being the same or different and wherein the total number of carbons in the alkyl groups is in the range of 20 to 80 carbons;
   (ii) an arylalkyl sulfonic acid wherein the aryl is phenyl or naphthyl and is substituted with 1–4 alkyl groups wherein each alkyl group is a linear or branched alkyl with 5–20 carbons with each alkyl group being the same or different and wherein the total number of carbons in the alkyl groups is in the range of 12–80;
   (iii) a derivative of (i) or (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;
   (iv) a metal salt of (i) or (ii) wherein the metal ion is selected from the group consisting of copper, aluminum, tin and zinc.

The invention is further directed to a process for crosslinking silane functional polyolefins by adding an alkylated naphthalene monosulfonic acid or an arylalkyl sulfonic acid or a hydrolyzable derivative thereof or a metal salt thereof as a crosslinking catalyst.

Although silane crosslinked polyethylene is well known, it is instructive to review the types of polymers, as well as the various processes which can be used to achieve a silane crosslinked polyolefin. The polyolefin used depends on the type of technology used to produce the silane functional polymer. For post grafting technology, so called "Sioplas technology" and the "monosil technology", where the grafting and addition of catalyst are all conducted in a single step, almost any polyolefin is acceptable. Examples of suitable polyolefins would be polyethylene, polypropylene, polyisobutylene, or mixtures thereof. Other suitable polymers would be the copolymers of ethylene with at least one of the following alpha-olefin monomers: 1-propene, 1-butene, 1-hexene, 1-octene and styrene. Such copolymers of ethylene with other alpha-olefins are commonly referred to as low density polyethylene (LDPE) and linear low density polyethylene (LLDPE). Also suitable would be copolymers of ethylene with a monomer selected from the following: vinylethers such as vinylmethyl ether, vinylethylether and phenylvinylether; acrylates such as methylacrylate, ethylacrylate, and methylmethacrylate; and vinyl esters such as vinylacetate.

The most preferred polyolefin for post grafting of a silane group thereon is polyethylene. Where an unsaturated silane compound is copolymerized with an olefin to incorporate the silane to the main chain of the polymer backbone, ethylene is the only suitable olefin.

Suitable unsaturated silanes would be of general structure, $CH_2=CH—Si—(OR)_3$, wherein R is any alkyl group of 1–4 carbons. Examples of unsaturated silane compounds would be vinyltrimethoxysilane, vinyltriethoxysilane, and vinyldimethoxyethoxysilane. The most preferred is vinyltrimethoxysilane (VTMS). The catalysts of the invention are useful in each of the methods because they are highly reactive and are effective in the presence of moisture.

There are three basic methods for producing a silane crosslinked polyolefin. The most commonly used silane is an ethylenically unsaturated silane, vinyltrimethoxysilane (VTMS). The first method involves the free radical promoted grafting of the alkoxysilane containing an unsaturated group onto a polyolefin to give a trialkoxysilane graft polyolefin. A free radical initiator is required to promote grafting. In a second step, a mixture of a crosslinking catalyst and other additives and pigments (referred to as the master batch), is combined with the siloxy polyethylene in an extruder at high temperature. The resulting polymer is cured, i.e. crosslinked, in a high humidity environment at a slightly elevated temperature over a period of several hours to several days. This process is commonly referred to as the "Sioplas process."

In a second method, the olefin is copolymerized with a small amount of a vinyl containing alkoxysilane to give a slightly different type of silane modified polyolefin than would be obtained by the grafting technique described above. The most commonly used is also an unsaturated silane compound, VTMS. In this case, VTMS is incorporated into the main chain of the polymer backbone and places the alkoxysilane groups in closer proximity to the polyolefin backbone than in the corresponding silane graft polymer. Incorporation of the alkoxysilane groups during olefin polymerization supposedly results in a more thermally stable polymer than a polymer using silane graft polyolefin. In a second step, the alkoxysilane functionalized polyolefin is crosslinked by the use of a catalyst incorporated as one component in a master batch. See U.S. Pat. No. 4,297,310.

A third method for producing a silane crosslinked polyolefin is a single step process whereby a polyolefin, VTMS, a free radical initiator, and the crosslinking catalyst are combined in an extruder at a specified temperature. In this case the grafting of the silane and the addition of the crosslinking catalyst occur in a single step. This process is commonly referred to as the "monosil" process.

The master batch accounts for about 5 wt % of the polymer composition and may include other additives such as antioxidants and pigments. The amount of catalyst present in the master batch will depend on the activity and molecular weight (MW) of the catalyst as well as the compatibility of the catalyst with the polymer.

It is important to note that the percentage of alkoxysilane incorporated into the polyolefin either through grafting or copolymerization is relatively small. Typically, the level of the silane crosslinking group is between 0.5 and 5 wt % with a preferred level of about 2 wt %. It is important to keep the relatively polar trialkoxysilane groups incorporated at a low level so that they do not significantly alter the nonpolar nature of the polyolefin. It should be noted that the siloxy polyolefins of the invention are very nonpolar. This restricts the type of crosslinking catalyst that can be used because the catalyst must possess good compatibility with the polyolefin in order to function properly.

The crosslinking catalyst that provides improved compatibility with a polyolefin is selected from the group consisting of:

(i) an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons;

(ii) an arylalkyl sulfonic acid wherein the aryl is phenyl or naphthyl and is substituted with 1–4 alkyl groups wherein each alkyl group is a linear or branched alkyl with 5–20 carbons with each alkyl group being the same or different, and wherein the total number of carbons in the alkyl groups is in the range of 12–80;

(iii) a derivative of (i) or (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;

(iv) a metal salt of (i) or (ii) wherein the metal ion is selected from the group consisting of copper, aluminum, tin and zinc.

The number of carbons in each substituent alkyl group of the alkylated naphthalene and the arylalkyl group will depend on their size and degree of branching. For alkylated naphthalene monosulfonic acids and the derivatives thereof, the total number of carbons in the alkyl groups is in the range of 20–80. The number of carbons in each alkyl group is in the range of 5–20. Preferably, the alkyl group on the naphthalene ring is a linear or branched alkyl with 10 to 18 carbons, and most preferably a linear alkyl of 10 to 18 carbons. Preferably, the number of alkyl groups on the naphthalene ring is 2 or 3. Most preferably, the total number of carbons in the alkyl groups on the naphthalene ring is in the range of 24 to 50. For arylalkyl sulfonic acids, the aryl group may be phenyl or naphthyl, preferably phenyl, substituted with at least two alkyl groups with the total number of carbons in the alkyl group(s) being 12–80, preferably 24–50. Each of the alkyl groups may be same or different, preferably the alkyl group is linear with 5–20 carbons, preferably 9–14 carbons.

The crosslinking catalyst may be a mixture of alkylated naphthalene monosulfonic acids or a mixture of the arylalkyl sulfonic acids.

The derivative of the alkylated naphthalene monosulfonic acid or arylalkyl sulfonic acid is selected from the group consisting of the anhydrides, esters, acetylates, epoxy blocked esters and amine salts thereof which is hydrolyzable to the corresponding alkylated naphthalene monosulfonic acid or the arylalkyl sulfonic acid. Examples of such derivatives include sulfonic acid anhydrides, alkyl sulfonic acid esters, epoxy blocked sulfonic acids, acetylated sulfonic acids, and amine salts of the alkylated naphthalene monosulfonic acids or arylalkyl sulfonic acids. The epoxy blocked sulfonic acid wherein the sulfonic acid group is reacted with an epoxide to provide a beta-hydroxy sulfonic acid ester. Suitable epoxy compounds for preparing an epoxy blocked sulfonic acid include diglycidyl ethers of bisphenol A or bisphenol F; diglycidyl ethers of a glycol, such as ethylene glycol, propylene glycol or butanediol; monoglycidyl ethers of C1 to C18 alpha olefin epoxides and 1,2-epoxycyclohexane.

The derivatives of the sulfonic acid crosslinking catalysts of the present invention may be prepared from the sulfonic acid in accordance with procedures well known in the art. The process for making an ester or an acetylate typically involves condensation of the sulfonic acid group with a hydroxy functioning group such as an alcohol, or an acetyl alcohol. The anhydride of a sulfonic acid is prepared by heating a sulfonic acid compound to remove $H_2O$ causing two sulfonic acid groups to condense to form an anhydride. The epoxy blocked esters are prepared from reacting the sulfonic acid with an epoxy compound. The metal salt of the alkylated naphthylene monosulfonic acid or the arylalkyl sulfonic acid can be prepared from the corresponding sulfonic acid using well known procedures. The process typically involves reaction of the corresponding sulfonic acid with a metal oxide or metal hydroxide in a suitable solvent such as methanol. The amine salt is prepared by reacting ammonia or an alcohol amine with the sulfonic acid group.

For the metal salts of alkylated naphthalene monosulfonic acid, the metal or arylalkyl acid salt is selected from the group consisting of aluminum, tin, copper, and zinc. Particularly preferred are zinc, tin, and aluminum. In one particularly preferred embodiment of the invention the catalyst is the zinc salt of a predominantly dinonylnaphthalene monosulfonic acid. In another preferred embodiment, the crosslinking catalyst is the zinc salt of a mixture of didodecylnaphthalene monosulfonic acid, tridodecylnaphthalene monosulfonic acid and tetradodecylnaphthalene monosulonic acid, or a zinc salt of (tetradecylphenyl) tetradecyl sulfonic acid.

Although the presence of metal ions may not provide a lower electro-conductivity, the metal salts of the present invention are highly compatible with polyethylene and form a single phase therewith.

The silane crosslinking catalysts useful in the invention are alkylated naphthalene monosulfonic acids as well as their corresponding derivatives and metal salts and arylalkyl sulfonic acids as well as their corresponding derivatives and metal salts.

In a preferred embodiment of the invention, the catalyst is a mixture of didodecylnaphthalene monosulfonic acid and tridodecyl naphthalene monosulfonic acid and tetradodecylnaphthalene sulfonic acid wherein the ratio of di, tri, and tetraalkylated naphthalene sulfonic acids is in a ratio of 2:1:1.

Preparation of Alkylnaphthalene Monosulfonic Acids

The alkylated naphthalene monosulfonic acid catalysts of the invention may be prepared by methods known to those skilled in the art. Generally, the known process involves alkylation of naphthalene followed by sulfonation. Suitable methods for alkylation commonly involve the reaction of naphthalene with an olefin, alcohol, alkylhalide, or other alkylating agent in the presence of a catalyst. The preferred alkylating agent is an olefin. Suitable catalysts for the alkylation of aryl moieties are Lewis acid or super acid catalysts known in the art. Lewis acid catalysts such as boron trifluoride, iron trichloride, tin tetrachloride, zinc dichloride or antimony pentafluoride may be used. Acidic clays, silica, or alumina may also be used. For example, the processes described in Hans Dressier, et. al., U.S. Pat. No. 4,604,491 and Yoshida, et. al., U.S. Pat. No. 4,714,794 may be employed. Hans Dressler, et. al., U.S. Pat. No. 4,604,491 discloses the alkylation of naphthalene with an olefin in the presence of an activated silica alumina clay. Yoshida, et. al., U.S. Pat. No. 4,714,794 discloses the alkylation of naphthalene with an olefin using activated clay. In addition, Ho et al., U.S. Pat. No. 5,602,086 discloses the use of super acid catalysts such as trifluoromethane sulfonic acid, hydrofluoric acid or trifluoromethylbenzene sulfonic acids may also be used. Another commonly used class of catalysts is the acidic zeolite catalysts (See Ashjian, et al., U.S. Pat. No. 5,034,563; Angevine et al., U.S. Pat. No. 5,001,296; Kuehl et al., U.S. Pat. No. 5,401,896). Examples of such catalysts are Zeolite Beta, Zeolite Y, ZSM-5, ZSM-35 and USY.

One preferred method is by the alkylation of the aryl moiety with an olefin using aluminum chloride as catalyst. In some instances, a co-catalyst such as nitromethane or nitrobenzene is also used to promote the reaction. Such methods are disclosed in King, et. al., U.S. Pat. No. 2,764,548 and Ho et al., U.S. Pat. No. 5,254,274.

The resulting intermediate alkylated aryl compound can then be sulfonated by means known in the art. Sulfonation is typically conducted by reacting the alkylated aryl compound with a sulfonating agent such as fuming sulfuric acid (oleum) sulfur trioxide or chlorosulfonic acid. The mole ratio of alkylated aryl compound to the sulfonating agent is adjusted accordingly to provide the monosulfonic acid as the preferred product. Examples of procedures for sulfonation are found in Jerry March, *Advanced Organic Chemistry. Reactions, Mechanisms and Structure*, $4^{th}$ edition, John Wiley and Sons, p.528, 1992. Typically about 0.8 to 1.2 moles of the sulfonating agent is added per mole of the aromatic compound in a hydrocarbon solvent. Once the sulfonation reaction is complete, the residual sulfuric acid is removed and the hydrocarbon layer is washed with water to remove the water-soluble impurities.

Preparation of Arylalkylsulfonic Acids

The aryl substituted alkyl sulfonic acids useful in the invention are those wherein the sulfonic acid group is attached to an alkyl group on an aromatic ring. These were described in Berger et al., U.S. Pat. No. 6,043,391. These compounds are typically prepared by the alkylation of an aromatic ring with an alkenylsulfonic acid. Particularly useful compounds of this type for the current invention have 1–4 linear or branched alkyl groups where the combined sum of the carbons in the alkyl groups is from 12–80. Particularly useful in the invention would be compounds where the aryl is phenyl and may be prepared from the alkylation of benzene or substituted benzene, such as toluene, with an alkenyl sulfonic acid.

The following nonrestrictive examples are provided to further illustrate the invention.

EXAMPLE 1

Dodecylated Naphthalene Sulfonic Acid

A mixture that is approximately 35% didodecylnaphthalene monosulfonic acid 44% tridodecylnaphthalene monosulfonic acid and 21% tetradodecylnaphthalene monosulfonic acid is prepared by one of the methods described above. The product is typically stored and used as a 50 wt % solution in heptane.

EXAMPLE 2

Dinonylnaphthalene Sulfonic Acid, Zinc Salt

Dinonyinaphthalene sulfonic acid, zinc sulfonate is prepared by the methods described above. The product is commercially available from King Industries as a 50% actives solution in mineral spirits as K-SPERSE 152/MS.

EXAMPLE 3

Didodecyl Naphthalene Sulfonic Acid

A mixture that is approximately 80% didodecylated naphthalene sulfonic acid and 20% tridodecylnaphthalene sulfonic acid is prepared by the alkylation of naphthalene with dodecene followed by sulfonation of the resulting alkylate with oleum.

EXAMPLE 4

(Tetradecylphenyl) Tetradecylsulfonic Acid (Tetradecylphenyl) tetradecylsulfonic acid was prepared according to procedures described in U.S. U.S. Pat. No. 6,043,391 from tetradecylbenzene and tetradecenylsulfonic acid.

Comparative Example 1

Dodecyl Benzene Sulfonic Acid (DDBSA)

Dodecyl benzene sulfonic acid (DDBSA) was purchased from Aldrich Chemical Company and used without further purification.

Comparative Example 2 p-toluene sulfonic (p-TSA) acid was purchased from Aldrich Chemical Company and used without further purification.

Physical Properties

The following measurements were made on the products of Examples 1 and 3 and comparative Examples 1 and 2

1. Conductivity Measurements

The conductivity of Example 1 was measured by incorporating the sulfonic acid into distilled water at 10, 100, and 1000 ppm and measuring the conductivity using a portable Cole Palmer Conductivity Meter. Comparative experiments were conducted on DDBSA of Comparative Example 1 and p-TSA of Comparative Example 2. The results reported in Table 1 show that the mixture of dodecylated naphthalene monosulfonic acid has significantly less conductivity than both p-TSA and DDBSA. It is therefore anticipated that crosslinked polyethylene coatings prepared with the dodecylated naphthalene monosulfonic acid mixture as catalyst will have a lower conductivity than corresponding coatings prepared using DDBSA or p-TSA as a catalyst.

TABLE 1

| | Conductivity (micro Siemens) in Distilled Water | | |
|---|---|---|---|
| | 1000 ppm | 100 pm | 10 ppm |
| p-TSA | 2230 | 200 | 16.7 |
| DDBSA | 1115 | 88.1 | 7.3 |
| Example 1 | 190 | 37.4 | 3.8 |

2. Solubility Parameter

Solubility parameter is calculated using the method of Hansen (3D method). Allan f. Barton, *Handbook of Solubility Parameters and Other Cohesion Parameters*, CRC Press, 1991. Due to the decrease in polarity, the catalysts of the present invention are expected to be less soluble in water. This is confirmed by the calculated solubility values reported in Table 2 where a lower number indicates a less polar molecule which is expected to have better compatibility with polyolefins. The values obtained for the dodecylated naphthalene monosulfonic acid mixture of Example 3 indicate that it is more compatible with polyethylene than p-TSA or DDBSA.

TABLE 2

CALCULATED Solubility Parameter

| | Solubility Parameter (Total) (delta/sqr(Mpa)) |
|---|---|
| p-TSA | 26.6 |
| DDBSA | 20.3 |
| Example 3 | 19.4 |

3. Water Solubility

Water solubility was calculated using Molecular Modeling Pro® (MMP) and the values are reported in Table 3. See Version 1.42, Published by WindowChem Software®. The calculated water solubility also shows that the solubility in water of the dodecylated naphthalene monosulfonic acid mixture is several orders of magnitude less than p-TSA and DDBSA. It is anticipated that the lower water solubility would make the dodecylated naphthalene monosulfonic acid mixture less extractable during the curing process.

TABLE 3

Solubility in Water (Calculated)

| | Solubility in Water (calculated) (mmole/L) |
|---|---|
| p-TSA | $1.17 \times 10^4$ |
| DDBSA | $1.44 \times 10^{-3}$ |
| Example 3 | $5.18 \times 10^{-13}$ |

4. Compatibility with Polyethylene

The improved compatibility of the catalysts of the invention over prior art catalysts is illustrated by incorporation into polyethylene wax followed by visual evaluation of the resulting mixture for signs of phase separation. The following nonlimiting examples are provided to illustrate how the catalysts may be incorporated into the polyethylene:

EXAMPLE 5

To 35 g of Example 1 was added 65 grams of polyethylene wax (melting point 99° C., penetration value 2) and heated with stirring for 20 minutes at 130 C. to provide a product which contains 35 wt % of the dodecylated naphthalene sulfonic acid mixture. The resulting melt was poured onto wax paper and allowed to cool to room temperature.

EXAMPLE 6

To 35 g of Example 2 was added 65 g of polyethylene wax (melting point 99° C., penetration value 2) and the whole is heated at 110° C. and 150 mm Hg so to remove the heptane solvent. The resulting melt was poured onto wax paper and allowed to cool to room temperature. The final product contains ~35 wt % of the zinc salt of dinonylnaphthalene sulfonic acid. The product was visually evaluated for compatibility with the polyethylene wax.

EXAMPLE 7

To 35 grams of Example 3 was added 65 grams of polyethylene wax (melting point 99° C., penetration value 2) and heated with stirring for 20 minutes at 130° C. to provide a product which contained 35 wt % of the dodecylated naphthalene sulfonic acid mixture. The resulting melt was poured onto wax paper and allowed to cool to room temperature.

Comparative Example 3

67 grams of DDBSA was mixed with 125 grams of polyethylene wax (melting point 99° C., penetration value 2) and heated to 130 C. for 20 minutes. The resulting melt was poured onto wax paper and allowed to cool to room temperature. The final product contained approximately 35 wt % DDBSA. After cooling to room temperature, the product was visually evaluated for compatibility with the polyethylene wax.

Comparative Example 4

67 grams of p-TSA is added 125 grams of polyethylene wax (melting point 99° C., penetration value 2) and heated at 130° C. for 20 minutes. The resulting melt was poured onto wax paper and allowed to cool to room temperature. The product contained 35 wt % of p-TSA. The product was visually evaluated for compatibility with the polyethylene wax.

TABLE 4

Compatibility with Polyethylene Wax

| | Observation |
|---|---|
| Example 5 | Compatible, single hase |
| Example 6 | Compatible, single phase |
| Example 7 | Compatible, single phase |
| Comparative Example 3 | Phase separated |
| Comparative Example 4 | Phase separated |

The results in Table 4 confirmed the expectation that the crosslinking catalysts of the present invention are highly compatible with polyolefins based on the calculated solubility parameter and water solubility values obtained above.

EXAMPLE 8

Crosslinking Studies

The catalysts of the invention were employed to crosslink polyethylene for use as wire insulation. The catalysts were incorporated into master batches at equal molar concentrations and then the master batches were blended with silane functional polyethylene and extruded onto 14 gauge wire. The procedure of incorporating the catalysts into the polymer and extrusion onto the wire are described below. The coated wires were evaluated to determine the degree of crosslinking by means of the ICEA T-28562 Hot Creep Test at various temperatures and relative humidity. The evaluation procedure and the results obtained are provided below.

Master Batching The catalysts of Examples 1–4 and Comparative Examples 1–2 were compounded separately into unfunctionalized low density polyethylene (LDPE), with a melt index 0.66 at 110° C., using equipment and procedures known to those skilled in the art. Each catalyst and LDPE were dry blended by hand prior to compounding. Compounding was conducted on a 1100 gram capacity Branbury Mixer Compounder at 100° C. for 7 minutes. The weight percent of the catalyst in each master batch was adjusted to deliver an equal molar concentration of the respective catalyst to the final wire coating.

The compounded master batch was converted to a form suitable for dry mixing with the silane functional polyethylene (XLPE). This was achieved through several physical processes. First, the hot compounded master batch was converted to ¼" thick sheets by a roll mill having heated rolls set at 70° C. The sheets were immediately cut into 3" strips after emerging from the roll mill. The strips were then allowed to cool to room temperature and then chopped into ¼" square pieces to match the particle sizes of XLPE, which in this case was nominally ¼" in diameter. It is important that the master batch and XLPE pellet size and weight are similar so that concentration gradients do not develop upon settling after dry blending.

Wire Coating by Extrusion

Each master batch was dry blended with the silane functional XLPE resin (AT-910, from AT Plastics, melt index=0.66) at 10 wt % prior to extrusion. The blended plastic was extruded onto 14 gauge copper wire using a Davis extruder having 4 heating zones (140° C., 150° C., 160° C., and 170° C.) and a screw with a 20:1 length to diameter ratio set at a speed of 15 rpm. The die was chosen to give an average coating wall thickness of 30 microns. About 100 ft of wire was extruded for each catalyst sample. In between each sample run about 100 ft. of wire was extruded from XLPE resin alone (no catalyst) to clean the extruder for the next sample. A control sample (containing no catalyst) was run first to eliminate the possibility of contamination. The wire from each run was immediately coiled and placed in individual large zip-lock bags which were then placed in a cooler with dry ice to prevent cure during long term storage.

Curing of Wire Samples and Evaluation of Degree of Crosslinking

The extent of crosslinking was measured by the ICEA T-28562 Hot Creep Test. In this test, sections of the finished wire samples for each catalyst, along with sections of the control (no catalyst), were cured under the following conditions:

1. 30° C. and 30% RH (Table 1)
2. 50° C. and 100% RH (Table 2)

Three 3-inch specimens of the insulation are stripped from each twelve inch section of wire at various intervals of 1 day, 3 days, 4 days and 7 days. A special wire stripper was used so that the insulation would not be deformed or pre-stressed prior to testing.

In the center of each 3-inch strip, a 1-inch section was marked with two lines with a permanent marker. Each of the strips was tested for "hot creep" to determine when the polymer was sufficiently crosslinked, and then tested for "hot set" if there was sufficient crosslinking.

The "hot creep" was conducted by suspending each sample strip at the top end from a stand in an oven at 150° C. with a weight of 119 g. attached to the bottom end. The weight used was determined based on the cross-sectional area of the wire coating and was calculated using the equations specified in the ICEA T-28562 test procedure. The strips were left in an oven for 15 minutes. A sample strip was deemed crosslinked, if it survived the 15 minute period in the oven without breaking. A sample strip that was not crosslinked broke within 2 minutes at 150° C. This is reported as "hot creep".

If the sample strip did not break after 15 minutes, the weight was removed and the strip was left for an additional 5 minutes in the oven. The strip was then removed from the oven and allowed to cool to room temperature. The percent change in length of the cooled sample is reported as the "hot set". It should be noted that the statistical error in the hot set measurement is ±5%.

The data from the test is presented in Table 5 and Table 6. Table 5 shows the results of "hot creep" and "hot set" for curing conditions at 30° C. and 30% relative humidity for strips which were obtained after 7 days of cure and Table 6 shows the results of "hot creep" and "hot set" for curing conditions at 50° C. and 100% relative humidity after 3 days of cure. A group of the 3 strips using Examples 1–4 and Comparative Examples 1–2 as the catalysts were tested. The fraction reported for "hot creep" in each of the tables represents the number of samples out of the three tested that passed the crosslinking test. Where the "hot creep" test showed that the polymer was sufficiently cured (crosslinked) then "hot set" test was conducted and the percent creep presented in the lower section of each table. The results for the two cure conditions show that Example 1, the alkylated naphthalene monosulfonic acid mixture at a slightly lower molar concentration provided comparable or better cure than DDBSA. This means that the catalysts of the invention have higher catalyst activity. In the "hot set" test, the results showing −5% is within the standard deviation of the method.

TABLE 5

Testing at 30° F. and 30% Relative Humidity

| Catalyst/Day | Conc.(mM/g) | Day 7 |
| --- | --- | --- |
| Hot Creep | | |
| None | 0 | 0/3 |
| DDBSA | $1.5 \times 10^{-3}$ | 3/3 |
| Example 1 | $1.25 \times 10^{-3}$ | 3/3 |
| Example 2 | $1.5 \times 10^{-3}$ | 3/3 |
| Example 3 | $1.5 \times 10^{-3}$ | 3/3 |
| Example 4 | $1.5 \times 10^{-3}$ | 3/3 |
| Hot Set | | |
| None | 0 | — |
| DDBSA | $1.5 \times 10^{-3}$ | 0% |
| Example 1 | $1.25 \times 10^{-3}$ | 0% |
| Example 2 | $1.5 \times 10^{-3}$ | −5% |
| Example 3 | $1.5 \times 10^{-3}$ | 0% |
| Example 4 | $1.5 \times 10^{-3}$ | −5% |

TABLE 6

Testing at 50° F. and 100% Relative Humidity

| Catalyst/Day | Conc.(mM/g) | Day 3 |
| --- | --- | --- |
| Hot Creep | | |
| None | 0 | (0/3) |
| DDBSA | $1.5 \times 10^{-3}$ | 3/3 |
| Example 1 | $1.25 \times 10^{-3}$ | 3/3 |
| Example 2 | $1.5 \times 10^{-3}$ | 3/3 |
| Example 3 | $1.5 \times 10^{-3}$ | 3/3 |
| Example 4 | $1.5 \times 10^{-3}$ | 3/3 |
| Hot Set | | |
| None | 0 | — |
| DDBSA | $1.5 \times 10^{-3}$ | 0% |
| Example 1 | $1.25 \times 10^{-3}$ | 0% |
| Example 2 | $1.5 \times 10^{-3}$ | −5% |
| Example 3 | $1.5 \times 10^{-3}$ | −5% |
| Example 4 | $1.5 \times 10^{-3}$ | −5% |

The above examples are provided to illustrate the invention and are not to be applied to limit the scope of the invention.

We claim:

1. A crosslinkable polyolefin composition comprising a polyolefin modified with hydrolyzable silane groups and a silanol crosslinking catalyst selected from the group consisting of:
   (i) an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons;
   (ii) an arylalkyl sulfonic acid wherein the sulfonic acid is attached to the alkyl group, the aryl is phenyl or naphthyl and is substituted with 1–4 alkyl groups wherein each alkyl group is a linear or branched alkyl with 5–20 carbons with each alkyl group being the same or different, and wherein the total number of carbons in the alkyl groups is in the range of 12–80;

(iii) a derivative of (i) or (ii) selected from the group consisting of an anhydride, an ester, an acetylate, an epoxy blocked ester and an amine salt thereof which is hydrolyzable to the corresponding alkyl group is a linear or branched alkyl with 10–18 carbons with each alkyl group being the same or different, wherein the total number of carbons in the alkyl groups is in the range of 20 to 70 carbons.

2. A crosslinkable polyolefin composition of claim 1 wherein the polyolefin is polyethylene.

3. A crosslinkable polyolefin composition of claim 1 or claim 2 wherein the silanol crosslinking catalyst is selected from the group consisting of:
(i) an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons;
(ii) a derivative of (i) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid; and
(iii) a metal salt of (i) wherein the metal ion is selected from the group consisting of copper, aluminum, tin and zinc.

4. A crosslinkable polyolefin composition of claim 3 wherein the silanol crosslinking catalyst is an alkylated naphthalene monosulfonic acid substituted with 1–4 alkyl groups wherein each alkyl group is a linear or branched alkyl with 10–18 carbons with each alkyl group being the same or different, wherein the total number of carbons in the alkyl groups is in the range of 20 to 70 carbons.

5. A crosslinkable polyolefin composition of claim 4 wherein the silanol crosslinking catalyst is didodecyl naphthalene monosulfonic acid.

6. A crosslinkable polyolefin composition of claim 4 wherein the silanol crosslinking catalyst is tridodecyl naphthalene monosulfonic acid.

7. A crosslinkable polyolefin composition of claim 4 wherein the silanol crosslinking catalyst is tetradodecyl naphthalene monosulfonic acid.

8. A crosslinkable polyolefin composition of claim 4 wherein the silanol crosslinking catalyst is a mixture of didodecyl naphthalene monosulfonic acid, tridodecyl naphthalene monosulfonic acid and tetradodecyl naphthalene monosulfonic acid.

9. A crosslinkable polyolefin composition of claim 3 wherein the silanol crosslinking catalyst is a metal salt of an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons.

10. A crosslinkable polyolefin composition of claim 9 wherein the silanol crosslinking catalyst is a metal salt of an alkylated naphthalene monosulfonic acid substituted with 1–4 alkyl groups wherein each alkyl group is a linear or branched alkyl with 10–18 carbons with each alkyl group being the same or different, wherein the total number of carbons in the alkyl groups is in the range of 20 to 70 carbons and the metal ion is selected from the group consisting of aluminum, tin and zinc.

11. A crosslinkable polyolefin composition of claim 10 wherein the silanol crosslinking catalyst is a zinc salt.

12. A crosslinkable polyolefin composition of claim 11 wherein the silanol crosslinking catalyst is a zinc salt of dinonylnaphthalene monosulfonic acid.

13. A crosslinkable polyolefin composition of claim 1 or claim 2 wherein the silanol crosslinking catalyst is selected from the group consisting of:
(ii) an arylalkyl sulfonic acid wherein the sulfonic acid is attached to the alkyl group, the aryl is phenyl or naphthyl and is substituted with 1–4 alkyl groups wherein each alkyl group is a linear or branched alkyl with 5–20 carbons with each alkyl group being the same or different, and wherein the total number of carbons in the alkyl groups is in the range of 12–80;
(iii) a derivative of (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;
(iv) a metal salt of (ii) wherein the metal ion is selected from the group consisting of copper, aluminum, tin and zinc.

14. A crosslinkable polyolefin composition of claim 13 wherein the silanol crosslinking catalyst is selected from the group consisting of an arylalkyl sulfonic acid wherein the aryl is phenyl and is substituted with 1–4 alkyl groups wherein each alkyl group is a linear or branched alkyl with 5–20 carbons with each alkyl group being the same or different, and wherein the total number of carbons in the alkyl groups is in the range of 12–80.

15. A crosslinkable polyolefin composition of claim 13 wherein the silanol crosslinking catalyst is selected from the group consisting of an arylalkyl sulfonic acid wherein the aryl is naphthyl and is substituted with 1–4 alkyl groups wherein each alkyl group is a linear or branched alkyl with 5–20 carbons with each alkyl group being the same or different, and wherein the total number of carbons in the alkyl groups is in the range of 25–50.

16. A crosslinkable polyolefin composition of claim 14 wherein the silanol crosslinking catalyst is (tetradecylphenyl) tetradecyl sulfonic acid.

17. A process for crosslinking a polyolefin modified with hydrolyzable alkoxysilane groups in the presence of moisture employing a silanol condensation catalyst selected from the group consisting of:
(i) an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons;
(ii) an arylalkyl sulfonic acid wherein the sulfonic acid is attached to the alkyl group, the aryl is phenyl or naphthyl and is substituted with 1–4 alkyl groups wherein each alkyl group is a linear or branched alkyl with 5–carbons with each alkyl group being the same or different, and wherein the total number of carbons in the alkyl groups is in the range of 12–80;
(iii) a derivative of (i) or (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;

(iv) a metal salt of (i) or (ii) wherein the metal ion is selected from the group consisting of copper, aluminum, tin and zinc;

wherein the process steps comprise:

forming a master batch of the silanol crosslinking catalyst with a polyolefin;

mixing the master batch with an alkoxysilana functional polyolefin to form a mixture at a concentration of 0.0005 to 0.0005 mM/g of the silanol crosslinking catalyst in the mixture;

heating and extruding the mixture as a coating onto a wire; and curing the extruded coating at a trmperature of 25° C. to 50° C. at a relative humidity of 25% to 100%.

18. The process of claim 17 wherein the polyolefin is polyethylene.

19. The process for crosslinking a polyolefin modified with hydrolyzable alkoxysilane groups in the presence of moisture of claim 18 wherein the concentration of the silanol crosslinking catalyst is 0.001 to 0.003 mM/g of the mixture.

20. The process for crosslinking a polyolefin modified with hydrolyzable alkoxysilane groups in the presence of moisture of claim 17, 18 or 19 wherein the silanol crosslinking catalyst is an alkylated naphthalene monosulfonic acid substituted with 1–4 alkyl groups wherein each alkyl group is a linear or branched alkyl with 10–18 carbons with each alkyl group being the same or different, wherein the total number of carbons in the alkyl groups is in the range of 20 to 70 carbons.

21. The process for crosslinking a polyolefin modified with hydrolyzable alkoxysilane groups in the presence of moisture of claim 20 wherein the silanol crosslinking catalyst is didodecyl naphthalene monosulfonic acid.

22. The process for crosslinking a polyolefin modified with hydrolyzable alkoxysilane groups in the presence of moisture of claim 20 wherein the silanol crosslinking catalyst is tridodecyl naphthalene monosulfonic acid.

23. The process for crosslinking a polyolefin modified with hydrolyzable alkoxysilane groups in the presence of moisture of claim 20 wherein the silanol crosslinking catalyst is a mixture of didodecyl naphthalene monosulfonic acid and tridodecyl naphthalene monosulfonic acid.

24. The process for crosslinking a polyolefin modified with hydrolyzable alkoxysilane groups in the presence of moisture of claim 17, 18 or 19 wherein the silanol crosslinking catalyst is a metal salt of an alkylated naphthalene monosulfonic acid substituted with 1–4 alkyl groups wherein each alkyl group is a linear or branched alkyl with 5–20 carbons with each alkyl group being the same or different, wherein the total number of carbons in the alkyl groups is in the range of 20 to 80 carbons.

25. The process for crosslinking a polyolefin modified with hydrolyzable alkoxysilane groups in the presence of moisture of claim 17, 18 or 19 wherein the silanol crosslinking catalyst is a metal salt of an alkylated naphthalene monosulfonic acid substituted with 1–4 alkyl groups wherein each alkyl group is a linear or branched alkyl with 10–18 carbons with each alkyl group being the same or different, wherein the total number of carbons in the alkyl groups is in the range of 20 to 70 carbons and the metal ion is selected from the group consisting of aluminum, tin and zinc.

26. The process for crosslinking a polyolefin modified with hydrolyzable alkoxysilane groups in the presence of moisture of claim 25 wherein the silanol crosslinking catalyst is a zinc salt.

27. The process for crosslinking a polyolefin modified with hydrolyzable alkoxysilane groups in the presence of moisture of claim 26 wherein the silanol crosslinking catalyst is a zinc salt of dinonylnaphthalene monosulfonic acid.

28. The process for crosslinking a polyolefin modified with hydrolyzable alkoxysilane groups in the presence of moisture of claim 17, 18 or 19 wherein the silanol crosslinking catalyst is selected from the group consisting of:

(ii) an arylalkyl sulfonic acid wherein the aryl is phenyl or naphthyl and is substituted with 1–4 alkyl groups wherein each alkyl group is a linear or branched alkyl with 5–20 carbons with each alkyl group being the same or different, and wherein the total number of carbons in the alkyl groups is in the range of 12–80;

(iii) a derivative of (ii) selected from the group consisting of an anhydride, an ester, an acetylate, an epoxy blocked ester and an amine salt thereof which is hydrolyzable to the corresponding alkyl naphthalene monosulfonic acid or the arylalkyl sulfonic acid;

(iv) a metal salt of (ii) wherein the metal ion is selected from the group consisting of copper, aluminum, tin and zinc.

29. The process for crosslinking polyolefin modified with hydrolyzable alkoxysilane groups in the presence of moisture of claim 28 wherein the silanol crosslinking catalyst is selected from the group consisting of an arylalkyl sulfonic acid wherein the aryl is phenyl and is substituted with 1–4 alkyl groups wherein each alkyl group is a linear or branched alkyl with 5–20 carbons with each alkyl group being the same or different, and wherein the total number of carbons in the alkyl groups is in the range of 25–50.

30. The process for crosslinking a polyolefin modified with hydrolyzable alkoxysilane groups in the presence of moisture of claim 27 wherein the silanol crosslinking catalyst is (tetradecylphenyl) tetradecyl sulfonic acid.

* * * * *